United States Patent
Deng et al.

(10) Patent No.: US 10,652,550 B2
(45) Date of Patent: May 12, 2020

(54) COMPENSATION TABLE COMPRESSING METHOD

(71) Applicant: Shenzhen China Star Optoelectronics Semiconductor Display Technology Co., Ltd., Shenzhen, Guangdong (CN)

(72) Inventors: Yufan Deng, Guangdong (CN); Ming-jong Jou, Guangdong (CN); Shen-sian Syu, Guangdong (CN)

(73) Assignee: Shenzhen China Star Optoelectronics Semiconductor Display Technology Co., Ltd., Shenzhen, Guangdong (CN)

( * ) Notice: Subject to any disclaimer, the term of this patent is extended or adjusted under 35 U.S.C. 154(b) by 149 days.

(21) Appl. No.: 16/072,181

(22) PCT Filed: Jan. 12, 2018

(86) PCT No.: PCT/CN2018/072468
§ 371 (c)(1),
(2) Date: Jul. 24, 2018

(87) PCT Pub. No.: WO2019/119572
PCT Pub. Date: Jun. 27, 2019

(65) Prior Publication Data
US 2019/0200022 A1    Jun. 27, 2019

(30) Foreign Application Priority Data
Dec. 22, 2017   (CN) .......................... 2017 1 1399355

(51) Int. Cl.
*H04N 19/159*     (2014.01)
*H04N 19/176*     (2014.01)
(Continued)

(52) U.S. Cl.
CPC ............. *H04N 19/159* (2014.11); *G09G 3/20* (2013.01); *G09G 3/3208* (2013.01); *H04N 19/105* (2014.11); *H04N 19/176* (2014.11); *H04N 19/182* (2014.11); *G09G 2320/0242* (2013.01); *G09G 2320/0285* (2013.01)

(58) Field of Classification Search
None
See application file for complete search history.

(56) References Cited

U.S. PATENT DOCUMENTS

2013/0136175 A1    5/2013  Wang
2013/0279569 A1   10/2013  Gao et al.
(Continued)

FOREIGN PATENT DOCUMENTS

CN    102595135 A    7/2012
CN    103024383 A    4/2013
(Continued)

*Primary Examiner* — Lindsay J Uhl
(74) *Attorney, Agent, or Firm* — Mark M. Friedman

(57) ABSTRACT

A compensation table compressing method is provided, processes each encoding block by prediction modes and select one prediction mode with the minimum rate distortion optimizing value as an optimized prediction mode by the rate distortion optimizing method such that each encoding block can correspond to an optimized prediction mode, which lowers the compression ratio of the compensation table and the time complexity of encoding and increases the quality of compression.

20 Claims, 9 Drawing Sheets

(51) Int. Cl.
  *H04N 19/182*     (2014.01)
  *G09G 3/20*       (2006.01)
  *H04N 19/105*     (2014.01)
  *G09G 3/3208*     (2016.01)

(56)              References Cited

U.S. PATENT DOCUMENTS

| | | |
|---|---|---|
| 2013/0279583 A1 | 10/2013 | Gao et al. |
| 2014/0105299 A1 | 4/2014 | Chen et al. |
| 2015/0201212 A1 | 7/2015 | Zhang et al. |
| 2017/0070745 A1 | 3/2017 | Lee et al. |
| 2018/0053284 A1* | 2/2018 | Rodriguez .............. G06T 5/006 |
| 2018/0191371 A1 | 7/2018 | Tao et al. |
| 2018/0357950 A1 | 12/2018 | Deng et al. |
| 2018/0357951 A1 | 12/2018 | Deng |
| 2019/0132001 A1* | 5/2019 | Deng ................... H03M 7/6011 |
| 2019/0206370 A1* | 7/2019 | Jiang ..................... G09G 5/026 |
| 2019/0237001 A1* | 8/2019 | Lin ...................... G09G 3/2044 |

FOREIGN PATENT DOCUMENTS

| | | |
|---|---|---|
| CN | 103079067 A | 5/2013 |
| CN | 103501437 A | 1/2014 |
| CN | 103797801 A | 5/2014 |
| CN | 104205843 A | 12/2014 |
| CN | 104618718 A | 5/2015 |
| CN | 104769948 A | 7/2015 |
| CN | 104796703 A | 7/2015 |
| CN | 106339196 A | 1/2017 |
| CN | 106688232 A | 5/2017 |
| CN | 107068050 A | 8/2017 |
| CN | 107294538 A | 10/2017 |

\* cited by examiner

COMPENSATION TABLE COMPRESSING METHOD

FIELD OF THE INVENTION

The present invention relates to display technology fields, especially to a compensation table compressing method.

BACKGROUND OF THE INVENTION

In the prior art, to eliminate the uneven brightness caused by a display panel, a compensation table is usually used to store compensation information of each pixel in the display panel such that the uneven brightness caused by the display panel is eliminated and display quality of the display panel is improved. In order to improve data transmission efficiency, the compensation tables need to be compressed At present, compression of the compensation tables usually directly employs a common universal encoder to compress the compensation tables. Because different encoding tools in the encoder have different influences on the performance of the compensation table, which results in that encoding time complexity cannot meet actual demands.

SUMMARY OF THE INVENTION

An objective of an embodiment of the present invention to provide a compensation table compressing method that can lower compression ratio of compensation tables and time complexity such that compression quality is increased.

A compensation table compressing method includes steps as follows:

acquiring multiple compensation tables of frames that are sequentially arranged;

dividing each compensation table of each frame into multiple encoding blocks, and processing each encoding block by multiple prediction modes to acquire prediction values corresponding to the prediction modes;

through a rate distortion optimizing method selecting one prediction mode with a minimum rate distortion optimizing value in each encoding block, and making subtraction between a prediction value corresponding to the prediction mode with the minimum rate distortion optimizing value in each encoding block and a value to be compressed of the encoding block to acquire a prediction error;

compression-processing the prediction error corresponding to each encoding block; wherein:

the rate distortion optimizing value is J=D+λ×R, wherein D refers to a deviation between the prediction value of a corresponding encoding block and the value to be compressed, λ refers to a weight factor, R indicates a number of bits needed for storing all information under a current prediction mode;

the prediction modes include simple inter-frame prediction, linear model prediction and intra-frame prediction;

the step of dividing each compensation table of each frame into multiple encoding blocks, and processing each encoding block by multiple prediction modes to acquire prediction values corresponding to the prediction modes, comprises:

utilizing the simple inter-frame prediction to process each encoding block to acquire first prediction values corresponding to the encoding blocks; utilizing the linear model prediction to process each encoding block to acquire second prediction values corresponding to the encoding blocks; utilizing the intra-frame prediction to process each encoding block to acquire third prediction values corresponding to the encoding blocks.

In the compensation table compressing method of the present invention, the step of utilizing the simple inter-frame prediction to process each encoding block to acquire first prediction values corresponding to the encoding blocks, comprises:

acquiring a reference frame compensation table; and matching a pixel reconstruction value corresponding to each encoding block in the reference frame compensation table with a compensation table to be compressed such that a first prediction value corresponding to each encoding block in the compensation table to be compressed is equal to the pixel reconstruction value corresponding to each encoding block in the reference frame compensation table.

In the compensation table compressing method of the present invention, the step of the utilizing the linear model prediction to process each encoding block to acquire second prediction values corresponding to the encoding blocks, comprises:

acquiring a reference frame compensation table;

matching a pixel reconstruction value corresponding to each encoding block in the reference frame compensation table with a compensation table to be compressed such that a fourth prediction value corresponding to each encoding block in the compensation table to be compressed is equal to the pixel reconstruction value corresponding to each encoding block in the reference frame compensation table; and linear-deviation correcting the fourth prediction value corresponding to each encoding block in the compensation table to be compressed to acquire a second prediction value corresponding to each encoding block in the compensation table to be compressed.

In the compensation table compressing method of the present invention, the step of linear-deviation correcting the fourth prediction value corresponding to each encoding block in the compensation table to be compressed to acquire a second prediction value corresponding to each encoding block in the compensation table to be compressed, comprises:

acquiring a first pixel reconstruction value of an adjacent region of each encoding block in the compensation table to be compressed, and a second pixel reconstruction value of a corresponding region of the reference frame compensation table;

according to the first pixel reconstruction value and second pixel reconstruction value, acquiring a weighted coefficient value and an offset value, wherein $$a = \frac{N * \sum (L(n) * C(n)) - \sum L(n) * \sum C(n)}{N * \sum (L(n) * L(n)) - \sum L(n) * \sum L(n)},$$

$$b = \frac{\sum C(n) - a * \sum L(n)}{N},$$

a indicates the weighted coefficient value, b indicates the offset value, N indicates a number of pixels in the adjacent region; L(n) indicates the first pixel reconstruction value; C(n) indicates the second pixel reconstruction value;

processing the fourth prediction value, the weighted coefficient value and the offset value to acquire the second prediction value corresponding to each encoding block in the compensation table to be compressed, wherein pred$_F$=a*pred+b, pered$_F$ indicates the second prediction value, pred indicates the fourth prediction value.

In the compensation table compressing method of the present invention, the step of acquiring a reference frame compensation table, comprises:

acquiring a value to be compressed of each of pixels in the compensation table to be compressed, and a pixel reconstruction value of each pixel in each of compressed compensation tables;

according to the value to be compressed of each pixel in the compensation table to be compressed and the pixel reconstruction value of each pixel in the compressed compensation table, acquiring a sum of absolute errors of a corresponding compressed compensation table the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel;

in the compressed compensation tables, selecting one compressed compensation table with a minimum one of the sums of the absolute errors as a reference frame compensation table.

In the compensation table compressing method of the present invention, the step of acquiring a reference frame compensation table, comprises:

acquiring a value to be compressed of each of pixels in the compensation table to be compressed, and a pixel reconstruction value of each pixel in each of compressed compensation tables;

according to the value to be compressed of each pixel in the compensation table to be compressed and the pixel reconstruction value of each pixel in the compressed compensation table, acquiring a sum of absolute errors of a corresponding compressed compensation table the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel;

in the compressed compensation tables, selecting one compressed compensation table with a minimum one of the sums of the absolute errors as a reference frame compensation table.

In the compensation table compressing method of the present invention, the step of acquiring a reference frame compensation table, comprises:

acquiring a value to be compressed of each of pixels in the compensation table to be compressed, and a pixel reconstruction value of each pixel in each of compressed compensation tables;

according to the value to be compressed of each pixel in the compensation table to be compressed and the pixel reconstruction value of each pixel in the compressed compensation table, acquiring a sum of absolute errors of a corresponding compressed compensation table the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel;

in the compressed compensation tables, selecting one compressed compensation table with a minimum one of the sums of the absolute errors as a reference frame compensation table.

In the compensation table compressing method of the present invention, the step of utilizing the intra-frame prediction to process each encoding block to acquire third prediction values corresponding to the encoding blocks, comprises:

acquiring pixel reconstruction values of pixels of an adjacent region corresponding to each encoding block; and acquiring an average value of the pixel reconstruction values of the pixels such that the third prediction value corresponding to each encoding block is equal to the average value of the pixel reconstruction values of the pixels of the adjacent region corresponding to each encoding block.

In the compensation table compressing method of the present invention, the step of compression-processing the prediction error corresponding to each encoding block, comprises: transforming, quantifying and entropy-encoding the prediction error.

A compensation table compressing method includes steps as follows:

acquiring multiple compensation tables of frames that are sequentially arranged;

dividing each compensation table of each frame into multiple encoding blocks, and processing each encoding block by multiple prediction modes to acquire prediction values corresponding to the prediction modes;

through a rate distortion optimizing method selecting one prediction mode with a minimum rate distortion optimizing value in each encoding block, and making subtraction between a prediction value corresponding to the prediction mode with the minimum rate distortion optimizing value in each encoding block and a value to be compressed of the encoding block to acquire a prediction error;

compression-processing the prediction error corresponding to each encoding block.

In the compensation table compressing method of the present invention, the prediction modes include: simple inter-frame prediction, linear model prediction and intra-frame prediction;

the step of dividing each compensation table of each frame into multiple encoding blocks, and processing each encoding block by multiple prediction modes to acquire prediction values corresponding to the prediction modes, comprises:

utilizing the simple inter-frame prediction to process each encoding block to acquire first prediction values corresponding to the encoding blocks; utilizing the linear model prediction to process each encoding block to acquire second prediction values corresponding to the encoding blocks; utilizing the intra-frame prediction to process each encoding block to acquire third prediction values corresponding to the encoding blocks.

In the compensation table compressing method of the present invention, the step of utilizing the simple inter-frame prediction to process each encoding block to acquire first prediction values corresponding to the encoding blocks, comprises:

acquiring a reference frame compensation table; and matching a pixel reconstruction value corresponding to each encoding block in the reference frame compensation table with a compensation table to be compressed such that a first prediction value corresponding to each encoding block in the compensation table to be compressed is equal to the pixel reconstruction value corresponding to each encoding block in the reference frame compensation table.

In the compensation table compressing method of the present invention, the step of the utilizing the linear model prediction to process each encoding block to acquire second prediction values corresponding to the encoding blocks, comprises:

acquiring a reference frame compensation table;

matching a pixel reconstruction value corresponding to each encoding block in the reference frame compensation table with a compensation table to be compressed such that a fourth prediction value corresponding to each encoding block in the compensation table to be compressed is equal to the pixel reconstruction value corresponding to each encoding block in the reference frame compensation table; and linear-deviation correcting the fourth prediction value corresponding to each encoding block in the compensation table to be compressed to acquire a second prediction value corresponding to each encoding block in the compensation table to be compressed.

In the compensation table compressing method of the present invention, the step of linear-deviation correcting the fourth prediction value corresponding to each encoding block in the compensation table to be compressed to acquire a second prediction value corresponding to each encoding block in the compensation table to be compressed, comprises:

acquiring a first pixel reconstruction value of an adjacent region of each encoding block in the compensation table to be compressed, and a second pixel reconstruction value of a corresponding region of the reference frame compensation table;

according to the first pixel reconstruction value and second pixel reconstruction value, acquiring a weighted coefficient value and an offset value, wherein $$a = \frac{N * \sum (L(n) * C(n)) - \sum L(n) * \sum C(n)}{N * \sum (L(n) * L(n)) - \sum L(n) * \sum L(n)},$$

$$b = \frac{\sum C(n) - a * \sum L(n)}{N},$$

a indicates the weighted coefficient value, b indicates the offset value, N indicates a number of pixels in the adjacent region; L(n) indicates the first pixel reconstruction value; C(n) indicates the second pixel reconstruction value;

processing the fourth prediction value, the weighted coefficient value and the offset value to acquire the second prediction value corresponding to each encoding block in the compensation table to be compressed, wherein $pred_F$=a*pred+b, $pered_F$ indicates the second prediction value, pred indicates the fourth prediction value.

In the compensation table compressing method of the present invention, wherein the step of acquiring a reference frame compensation table, comprises:

acquiring a value to be compressed of each of pixels in the compensation table to be compressed, and a pixel reconstruction value of each pixel in each of compressed compensation tables;

according to the value to be compressed in the compensation table to be compressed and the pixel reconstruction value of each pixel in the compressed compensation table, acquiring a sum of absolute errors of a corresponding compressed compensation table and the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel; and in the compressed compensation tables, selecting one compressed compensation table with a minimum one of the sums of the absolute errors as a reference frame compensation table.

In the compensation table compressing method of the present invention, the step of utilizing the intra-frame prediction to process each encoding block to acquire third prediction values corresponding to the encoding blocks, comprises:

acquiring pixel reconstruction values of pixels of an adjacent region corresponding to each encoding block; and acquiring an average value of the pixel reconstruction values of the pixels such that the third prediction value corresponding to each encoding block is equal to the average value of the pixel reconstruction values of the pixels of the adjacent region corresponding to each encoding block.

In the compensation table compressing method of the present invention, the rate distortion optimizing value is J=D+λ×R, wherein D refers to a deviation between the prediction value of a corresponding encoding block and the value to be compressed, λ refers to a weight factor, R indicates a number of bits needed for storing all information under a current prediction mode.

In the compensation table compressing method of the present invention, the step of compression-processing the prediction error corresponding to each encoding block, comprises: transforming, quantifying and entropy-encoding the prediction error.

The compensation table compressing method of the present invention, processes each encoding block by prediction modes and select one prediction mode with the minimum rate distortion optimizing value as an optimized prediction mode by the rate distortion optimizing method such that each encoding block can correspond to an optimized prediction mode, which lowers the compression ratio of the compensation table and the time complexity of encoding and increases the quality of compression.

DESCRIPTION OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

DETAILED DESCRIPTION OF THE PREFERRED EMBODIMENTS

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

Figure 1:
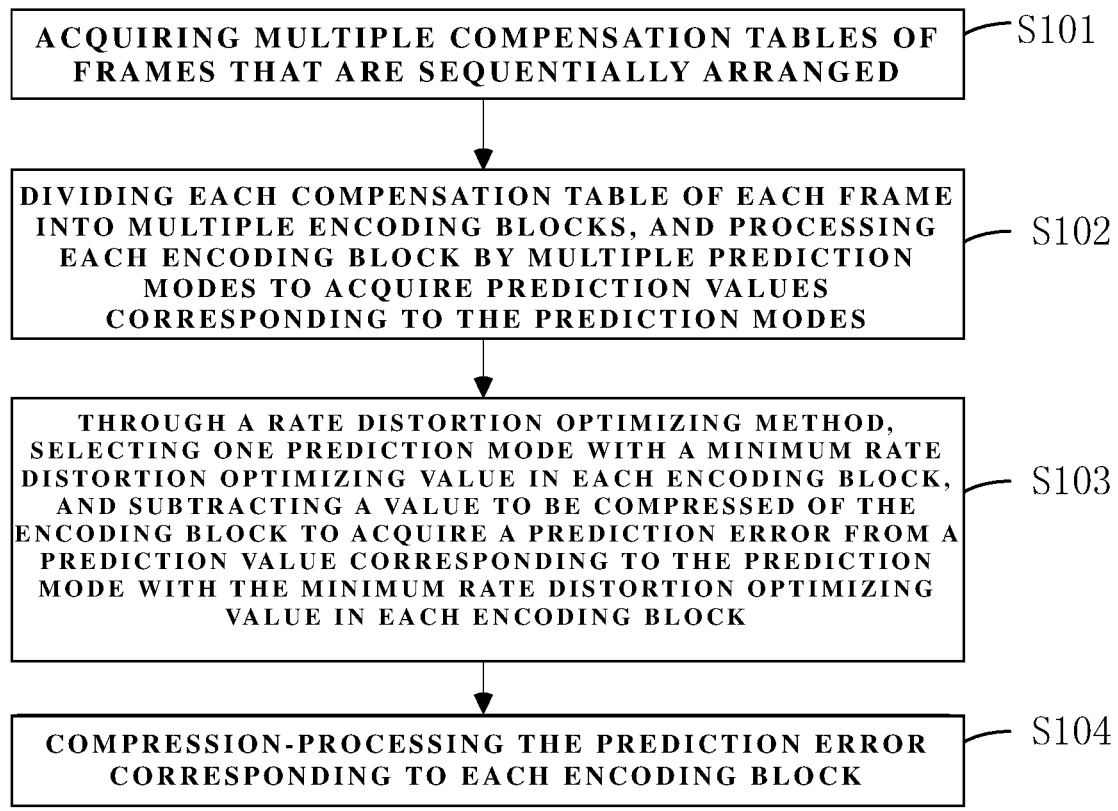
FIG. 1 is a schematic view of a step flowchart of a compensation table compressing method provided by an embodiment of the present invention.

With reference to FIG. 1, FIG. 1 is a schematic view of a step flowchart of a compensation table compressing method provided by an embodiment of the present invention. As shown in FIG. 1, the embodiment of the present invention provides a compensation table compressing method, including steps as follows:

step S101, including acquiring multiple compensation tables of frames that are sequentially arranged;

step S102, including dividing each compensation table of each frame into multiple encoding blocks, and processing each encoding block by multiple prediction modes to acquire prediction values corresponding to the prediction modes;

step S103, including through a rate distortion optimizing method selecting one prediction mode with a minimum rate distortion optimizing value in each encoding block, and making subtraction between a prediction value corresponding to the prediction mode with the minimum rate distortion optimizing value in each encoding block and a value to be compressed of the encoding block to acquire a prediction error;

step S104, including compression-processing the prediction error corresponding to each encoding block.

In the step S101 of acquiring multiple compensation tables of frames that are sequentially arranged, it is necessary to indicate that in an organic light-emitting diode (OLED) display panel, compensation tables defined by m colors and n grayscales are included, and the organic light-emitting diode display panel has m×n compensation tables; furthermore, when the compensation tables in the organic light-emitting diode display panel are compressed, the compensation tables in the organic light-emitting diode display panel can be arranged into multiple frames according to different colors and different grayscales and be compressed, a person of ordinary skill can arrange the compensation tables based on different characteristics thereof without limitations.

Figure 2:
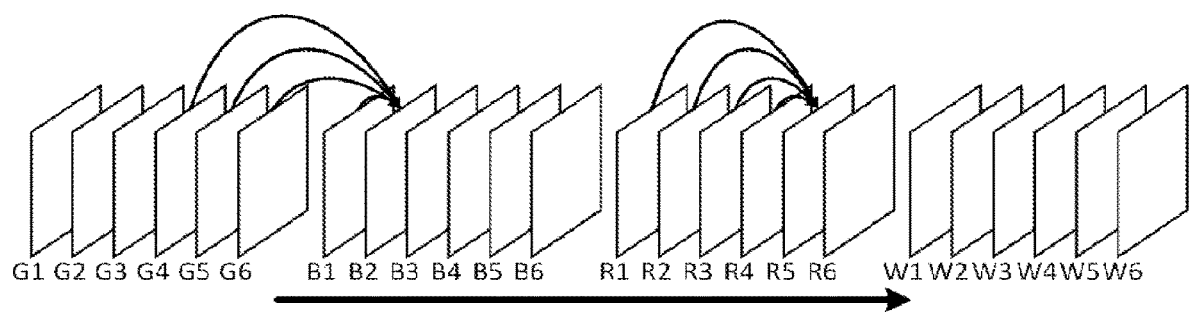
FIG. 2 is a schematic view of an arrangement of compensation tables of the compensation table compressing method provided by the embodiment of the present invention.

For example, with reference to FIG. 2, FIG. 2 is a schematic view of an arrangement of compensation tables of the compensation table compressing method provided by the embodiment of the present invention. As shown in FIG. 2, to compress 24 compensation tables including 4 colors and 6 grayscales in the organic light-emitting diode display panel, the 24 compensation tables can be divided into 4 sets of compensation tables based on different colors. The compensation tables of each set are divided into 6 frames of the compensation table based on different grayscales such that 24 frames of the compensation tables sequentially arranged as shown in FIG. 2 are obtained, wherein G1-G6 indicate 6 grayscales corresponding to green colors, B1-B6 indicate 6 grayscales corresponding to blue colors, R1-R6 indicate 6 grayscales corresponding to red colors, W1-W6 indicate 6 grayscales corresponding to white colors.

In the step S102 of dividing each compensation table of each frame into multiple encoding blocks, and processing each encoding block by multiple prediction modes to acquire prediction values corresponding to the prediction modes, specifically, the prediction modes may include: simple inter-frame prediction, linear model prediction and intra-frame prediction. It should be noted that a person of ordinary skill can utilize other prediction modes to process each encoding block. The present invention is to emphasize when compensation table is compressed, each encoding block is simultaneously processed with multiple prediction modes such that quality of compression is increased.

Figure 3:
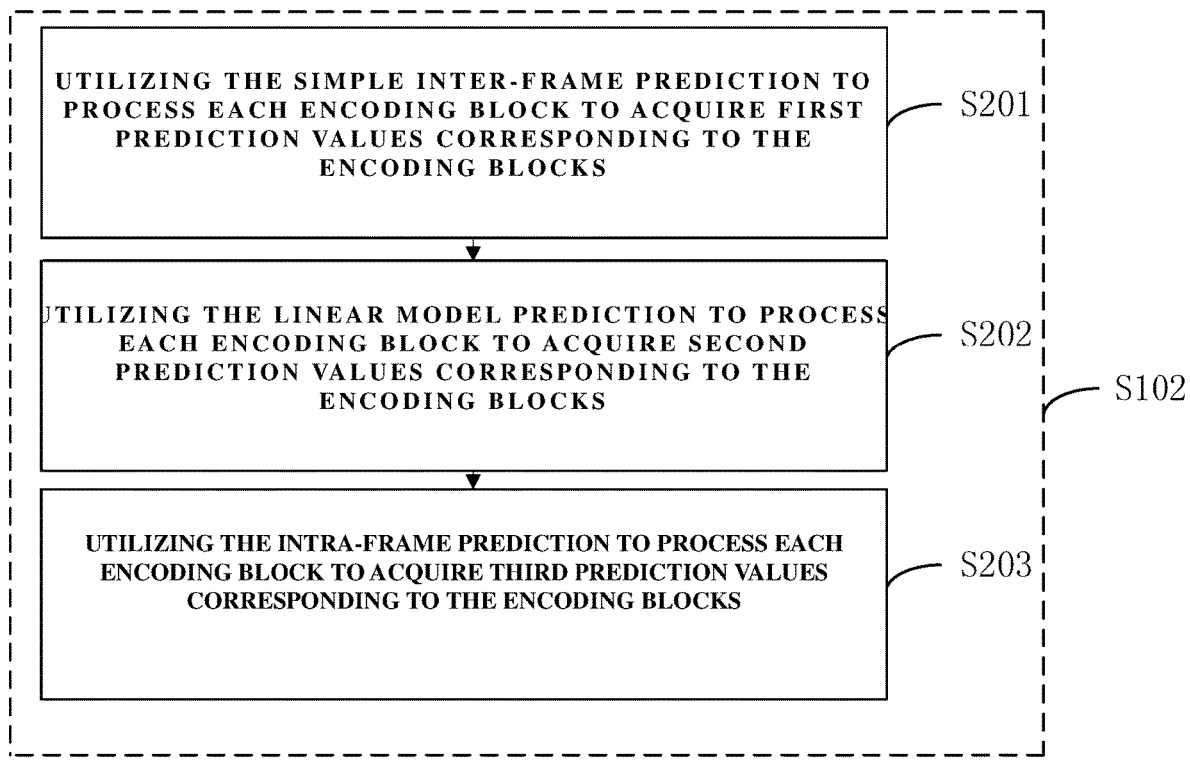
FIG. 3 is a schematic view of a flowchart of step S102 of the compensation table compressing method provided by the embodiment of the present invention.

Furthermore, with reference to FIG. 3, FIG. 3 is a schematic view of a flowchart of the step S102 of the compensation table compressing method provided by the embodiment of the present invention. As shown in FIG. 3, the step S102 includes: step S201 including utilizing the simple inter-frame prediction to process each encoding block to acquire first prediction values corresponding to the encoding blocks; step S202 including utilizing the linear model prediction to process each encoding block to acquire second prediction values corresponding to the encoding blocks; step S203 including utilizing the intra-frame prediction to process each encoding block to acquire third prediction values corresponding to the encoding blocks.

Figure 4:
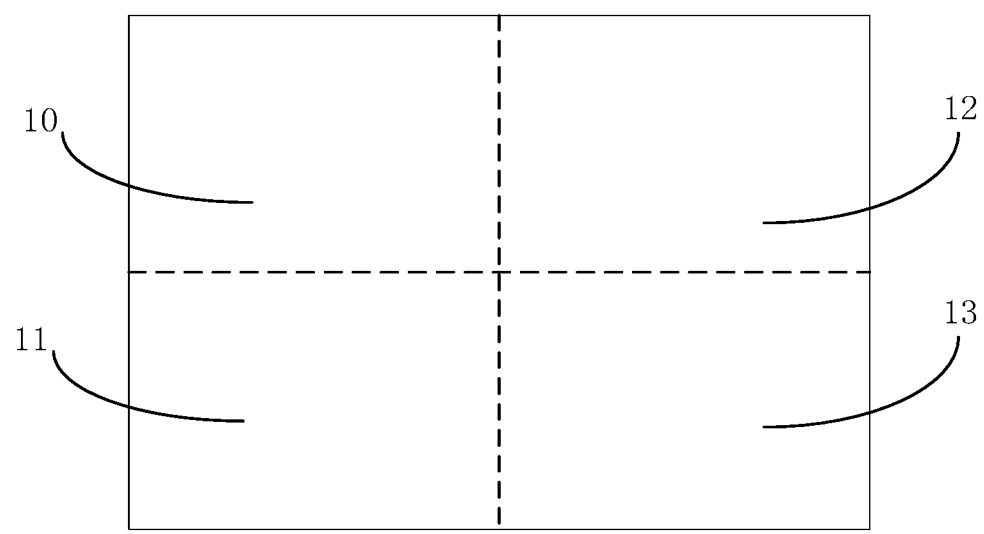
FIG. 4 is a schematic view of division of an encoding block of a compensation table of any one frame in FIG. 2.

For example, with reference to FIG. 4, is a schematic view of division of an encoding block of a compensation table of any one frame in FIG. 2. As shown in FIG. 4, the compensation table may be divided into 4 encoding blocks that are a first encoding block 10, a second encoding block 11, a third encoding block 12 and a fourth encoding block 13. When the compensation table is compressed, the first encoding block 10 can be processed with the simple inter-frame prediction, the linear model prediction and the intra-frame prediction, the second encoding block 11 can be processed with the simple inter-frame prediction, the linear model prediction and the intra-frame prediction, the third encoding block 12 can be processed with the simple inter-frame prediction, the linear model prediction and the intra-frame prediction, and the fourth encoding block 13 can be processed with the simple inter-frame prediction, the linear model prediction and the intra-frame prediction. It should be noted that the division of the compensation table as shown in FIG. 3 is merely an example of the present invention, and a person of ordinary skill in the art can divide the compensation table based on demands without limitations.

Figure 5:
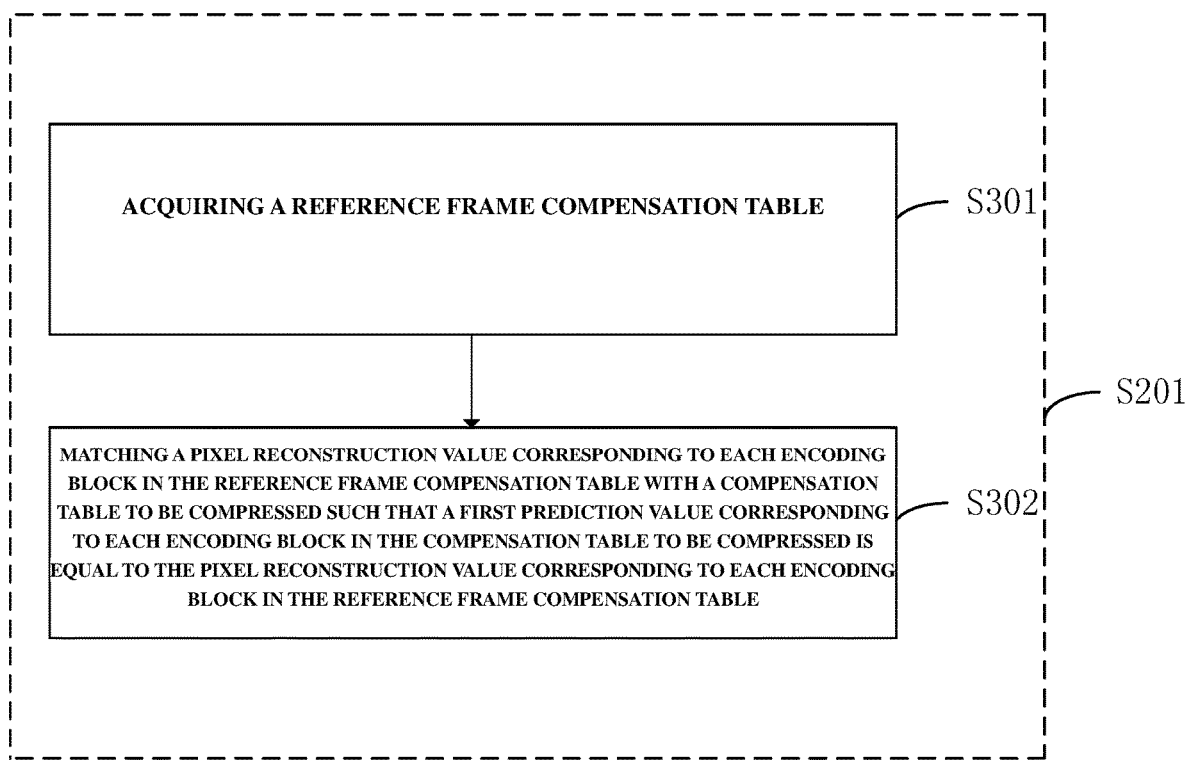
FIG. 5 is a schematic view of a flowchart of step S201 of the compensation table compressing method provided by the embodiment of the present invention.

With reference to FIG. 5, FIG. 5 is a schematic view of a flowchart of the step S201 of the compensation table compressing method provided by the embodiment of the present invention. With reference to FIG. 5, the step S201 includes: step S301 including acquiring a reference frame compensation table; step S302 including matching a pixel reconstruction value corresponding to each encoding block in the reference frame compensation table with a compensation table to be compressed such that a first prediction value corresponding to each encoding block in the compensation table to be compressed is equal to the pixel reconstruction value corresponding to each encoding block in the reference frame compensation table.

For example, with reference to FIGS. 2 and 4, when the compensation table R5 is compressed, the compensation table R4 can be selected as a reference frame compensation table. Each of the compensation table R5 and the compensation table R4 is divided into 4 encoding blocks. The first encoding block 10, the second encoding block 11, the third encoding block 12 and the fourth encoding block 14 of the compensation table R4 are matched with the first encoding block 10, the second encoding block 11, the third encoding block 12 and the fourth encoding block 14 of the compensation table R5 such that a first prediction value of the first encoding block 10 in the compensation table R5 is equal to a pixel reconstruction value of first encoding block 10 in the compensation table R4, and a first prediction value of the second encoding block 11 in the compensation table R5 is equal to a pixel reconstruction value of the second encoding block 11 in the compensation table R4, a first prediction value of the third encoding block 12 in the compensation table R5 is equal to a pixel reconstruction value of the third encoding block 12 in the compensation table R4, and a first prediction value of the fourth encoding block 13 in the compensation table R5 is equal to a pixel reconstruction value of the fourth encoding block 13 in the compensation table R4.

Figure 6:
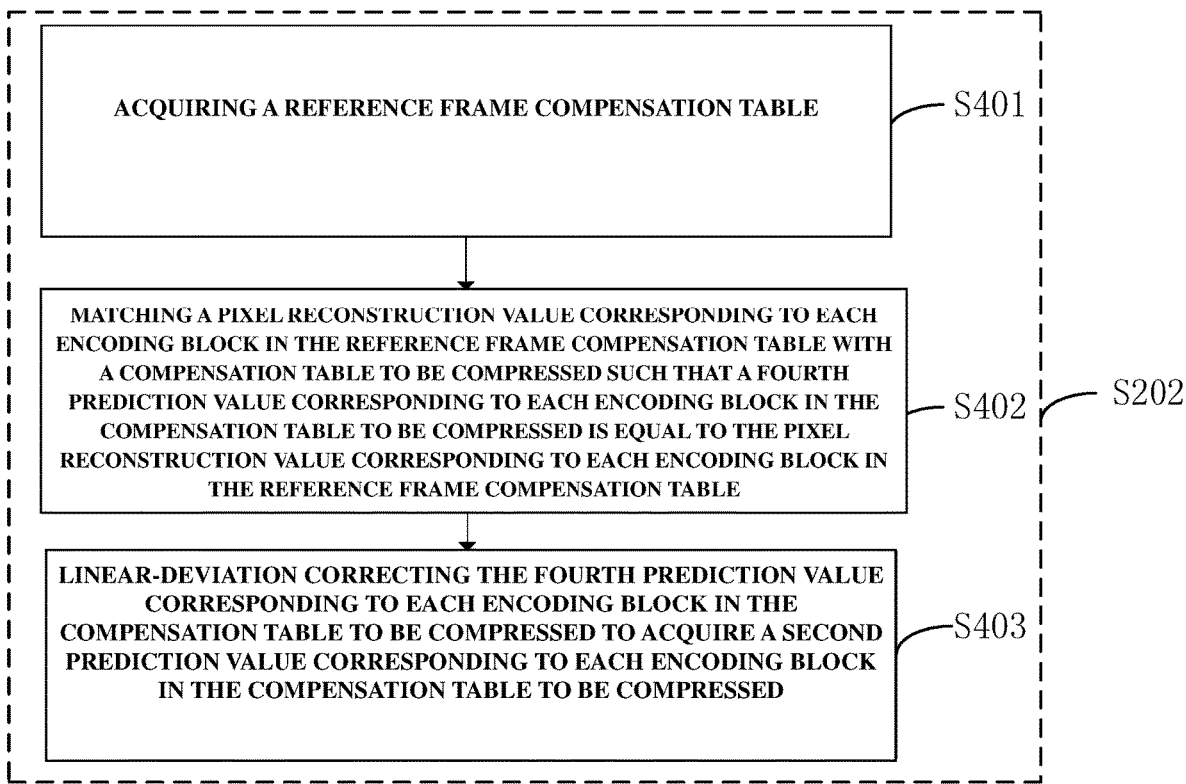
FIG. 6 is a schematic view of a flowchart of step S202 of the compensation table compressing method provided by the embodiment of the present invention.

With reference to FIG. 6, FIG. 6 is a schematic view of a flowchart of the step S202 of the compensation table compressing method provided by the embodiment of the present invention. As shown in FIG. 6, the step S202 includes: step S401 including acquiring a reference frame compensation table; step S402 including matching a pixel reconstruction value corresponding to each encoding block in the reference frame compensation table with a compensation table to be compressed such that a fourth prediction value corresponding to each encoding block in the compensation table to be compressed is equal to the pixel reconstruction value corresponding to each encoding block in the reference frame compensation table; step 403 including linear-deviation correcting the fourth prediction value corresponding to each encoding block in the compensation table to be compressed to acquire a second prediction value corresponding to each encoding block in the compensation table to be compressed.

It should be noted that the step S401 and the step S402 are similar to the above step S301 and step S302, details of these steps can refer to the above descriptions and will not be repeated here.

Figure 7:
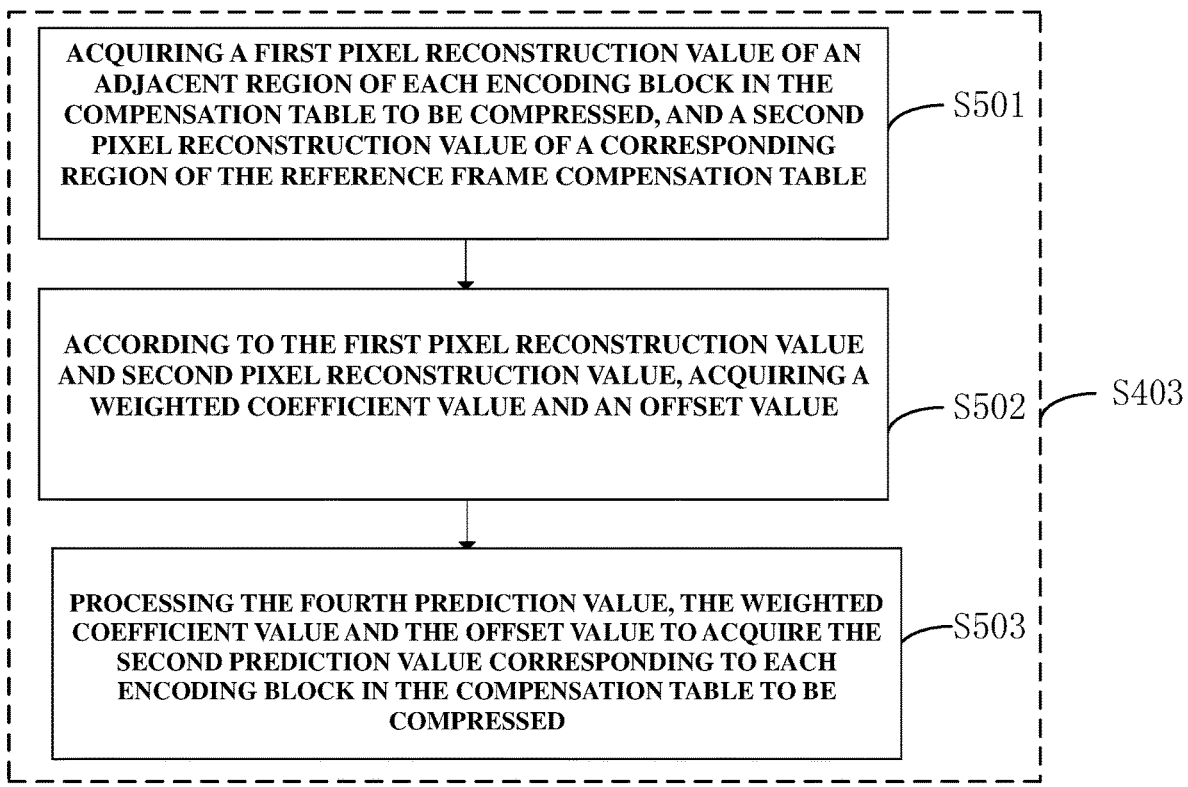
FIG. 7 is a schematic view of a flowchart of step S403 of the compensation table compressing method provided by the embodiment of the present invention.

Furthermore, with reference to FIG. 7, FIG. 7 is a schematic view of a flowchart of the step S403 of the compensation table compressing method provided by the embodiment of the present invention. As shown in FIG. 7, the step S403 includes: step S501 including acquiring a first pixel reconstruction value of an adjacent region of each encoding block in the compensation table to be compressed, and a second pixel reconstruction value of a corresponding region of the reference frame compensation table; step S502 including, according to the first pixel reconstruction value and second pixel reconstruction value, acquiring a weighted coefficient value and an offset value, wherein $$a = \frac{N * \sum (L(n) * C(n)) - \sum L(n) * \sum C(n)}{N * \sum (L(n) * L(n)) - \sum L(n) * \sum L(n)},$$

$$b = \frac{\sum C(n) - a * \sum L(n)}{N},$$

a indicates the weighted coefficient value, b indicates the offset value, N indicates a number of pixels in the adjacent region; L(n) indicates the first pixel reconstruction value; C(n) indicates the second pixel reconstruction value, processing the fourth prediction value, the weighted coefficient value and the offset value to acquire the second prediction value corresponding to each encoding block in the compensation table to be compressed, wherein $pred_F = a*pred+b$, $pered_F$ indicates the second prediction value, pred indicates the fourth prediction value.

For example, with reference to FIGS. 2 and 4, when the compensation table R5 is compressed, the compensation table R4 can be selected as a reference frame compensation table. Each of the compensation table R5 and the compensation table R4 is divided into 4 encoding blocks, the first encoding block 10, the second encoding block 11, the third encoding block 12 and the fourth encoding block 13 in the compensation table R4 are matched with the first encoding block 10, the second encoding block 11, the third encoding block 12 and the fourth encoding block 14 in the compensation table R5 such that a fourth prediction value of the first encoding block 10 in the compensation table R5 is equal to a pixel reconstruction value of the first encoding block 10 in the compensation table R4, a fourth prediction value of the second encoding block 11 in the compensation table R5 is equal to a pixel reconstruction value of the second encoding block 11 in the compensation table R4, a fourth prediction value of the third encoding block 12 in the compensation table R5 is equal to a pixel reconstruction value of the third encoding block 12 in the compensation table R4, and a fourth prediction value of the fourth encoding block 13 in the compensation table R5 is equal to a pixel reconstruction value of the fourth encoding block 13 in the compensation table R4.

Furthermore, the second encoding block 11 in the compensation table R5 is taken as an example. A first pixel reconstruction value of the adjacent region of the second encoding block 11 in the compensation table R5 a second pixel reconstruction value of the region of the compensation table R4 corresponding to the adjacent region are acquired. Then a weighted coefficient value and an offset value are acquired according to the first pixel reconstruction value and the second pixel reconstruction value, wherein $$a = \frac{N * \sum (L(n) * C(n)) - \sum L(n) * \sum C(n)}{N * \sum (L(n) * L(n)) - \sum L(n) * \sum L(n)},$$

$$b = \frac{\sum C(n) - a * \sum L(n)}{N},$$

a indicates the weighted coefficient value, b indicates the offset value, N indicates a number of pixels in the adjacent region; L(n) indicates the first pixel reconstruction value; C(n) indicates the second pixel reconstruction value; step S503 including processing the fourth prediction value, the weighted coefficient value and the offset value to acquire the second prediction value corresponding to each encoding block in the compensation table to be compressed, wherein $pred_F=a*pred+b$, $pered_F$ indicates the second prediction value, pred indicates the fourth prediction value. Other encoding blocks in the compensation table R5 are compressed according to the above descriptions.

Figure 8:
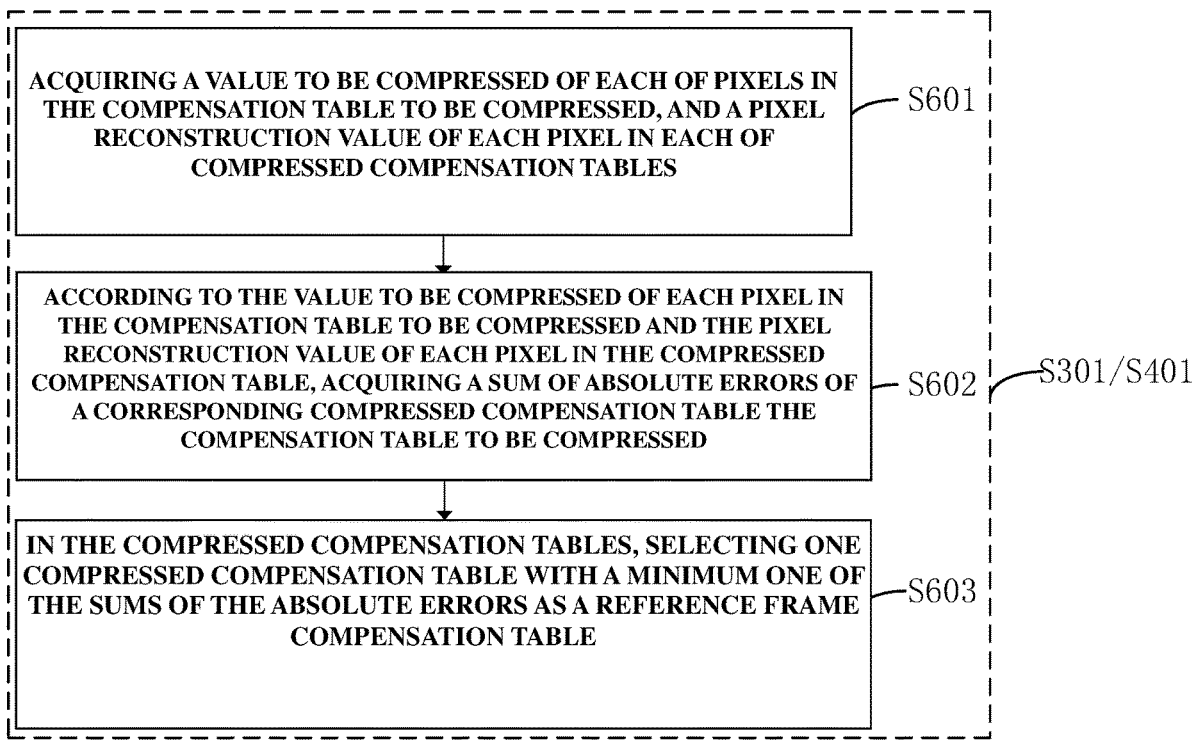
FIG. 8 is a schematic view of a flowchart of step S301 and step S401 of the compensation table compressing method provided by the embodiment of the present invention.

Furthermore, with reference to FIG. 8, FIG. 8 is a schematic view of a flowchart of the step S301 and the step S401 of the compensation table compressing method provided by the embodiment of the present invention. As shown in FIG. 8, each of the step S301 and the step S401 includes: step S601 including acquiring a value to be compressed of each of pixels in the compensation table to be compressed, and a pixel reconstruction value of each pixel in each of compressed compensation tables; step S602 including according to the value to be compressed of each pixel in the compensation table to be compressed and the pixel reconstruction value of each pixel in the compressed compensation table, acquiring a sum of absolute errors of a corresponding compressed compensation table the compensation table to be compressed, wherein $SAD=\Sigma|f1(x,y)-f2(x,y)|$, SAD indicates the sum of the absolute errors, x, y indicate a pixel coordinate, f1 indicates the value to be compressed corresponding to a pixel to be compressed, f2 indicates the pixel reconstruction value corresponding to a compressed pixel; step S603 including in the compressed compensation tables, selecting one compressed compensation table with a minimum one of the sums of the absolute errors as a reference frame compensation table.

Figure 9:
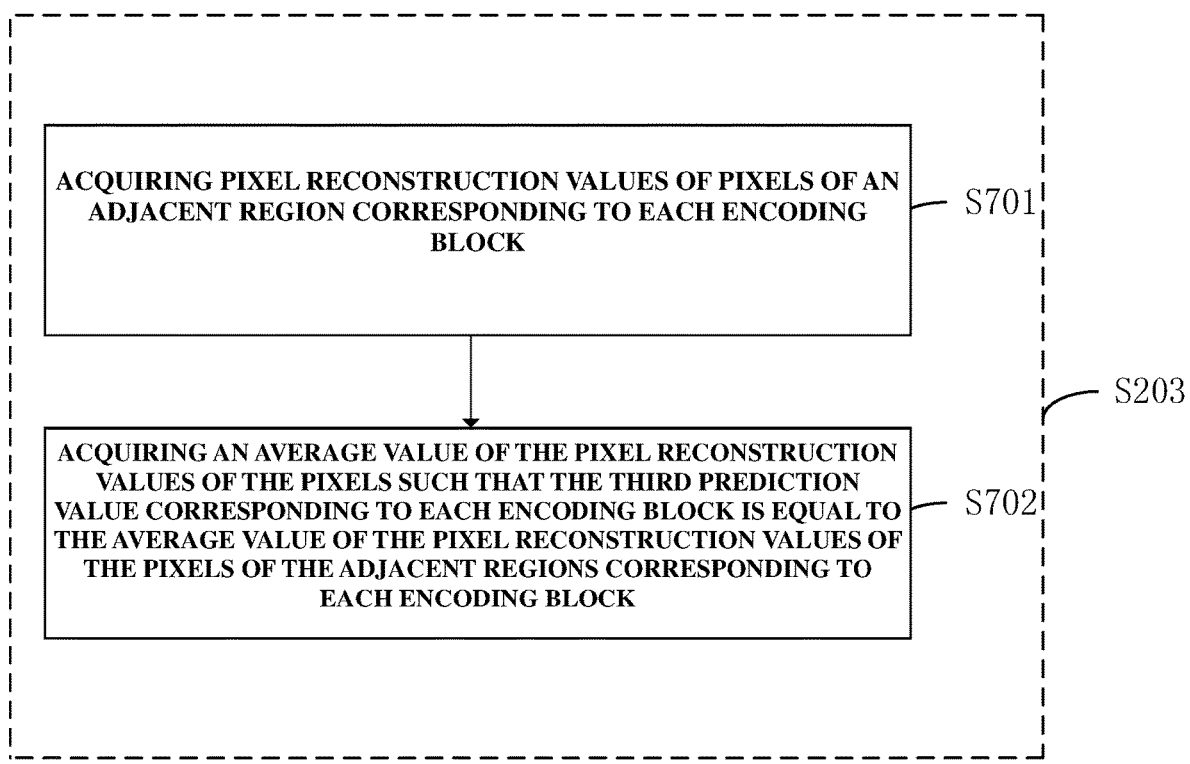
FIG. 9 is a schematic view of a flowchart of step S203 of the compensation table compressing method provided by the embodiment of the present invention.

With reference to FIG. 9, is a schematic view of a flowchart of the step S203 of the compensation table compressing method provided by the embodiment of the present invention. As shown in FIG. 9, the step S203 includes: step S701 including acquiring pixel reconstruction values of pixels of an adjacent region corresponding to each encoding block; step S702 including acquiring an average value of the pixel reconstruction values of the pixels such that the third prediction value corresponding to each encoding block is equal to the average value of the pixel reconstruction values of the pixels of the adjacent region corresponding to each encoding block.

In the step S103, one prediction mode with a minimum rate distortion optimizing value in each encoding block is selected through a rate distortion optimizing method, and subtraction between a prediction value corresponding to the prediction mode with the minimum rate distortion optimizing value in each encoding block and a value to be compressed of the encoding block is made to acquire a prediction error.

Specifically, rate distortion optimizing value $J=D+\lambda \times R$, wherein D refers to a deviation between the prediction value of a corresponding encoding block and the value to be compressed, $\lambda$ refers to a weight factor, R indicates a number of bits needed for storing all information under a current prediction mode. It should be noted that the less the rate distortion optimizing value is, the less the deviation and the number of bits for indicating a corresponding prediction mode are less.

The step S104 of compression-processing the prediction error corresponding to each encoding block, includes: transforming, quantifying and entropy-encoding the prediction error.

The compensation table compressing method of the present invention, processes each encoding block by prediction modes and select one prediction mode with the minimum rate distortion optimizing value as an optimized prediction mode by the rate distortion optimizing method such that each encoding block can correspond to an optimized prediction mode, which lowers the compression ratio of the compensation table and the time complexity of encoding and increases the quality of compression.

The liquid crystal display assembly provided in the embodiment of the present invention has been described above in detail. The principle and the implementation of the present invention are described by using specific examples in this specification. The description of the foregoing embodiments is merely used to help understand the present invention. Meanwhile, those skilled in the art can make modifications to the detailed embodiments and the application extent according to the spirit of the present invention. In summary, the contents of the present specification should not be construed as limitations on the present invention.

What is claimed is:

1. A compensation table compressing method comprising steps as follows:

acquiring multiple compensation tables of frames that are sequentially arranged;

dividing each compensation table of each frame into multiple encoding blocks, and processing each encoding block by multiple prediction modes to acquire prediction values corresponding to the prediction modes;

through a rate distortion optimizing method selecting one prediction mode with a minimum rate distortion optimizing value in each encoding block, and making subtraction between a prediction value corresponding to the prediction mode with the minimum rate distortion optimizing value in each encoding block and a value to be compressed of the encoding block to acquire a prediction error;

compression-processing the prediction error corresponding to each encoding block; wherein:

the rate distortion optimizing value is $J=D+\lambda \times R$, wherein D refers to a deviation between the prediction value of a corresponding encoding block and the value to be compressed, $\lambda$ refers to a weight factor, R indicates a number of bits needed for storing all information under a current prediction mode;

the prediction modes include simple inter-frame prediction, linear model prediction and intra-frame prediction;

the step of dividing each compensation table of each frame into multiple encoding blocks, and processing each encoding block by multiple prediction modes to acquire prediction values corresponding to the prediction modes, comprises:

utilizing the simple inter-frame prediction to process each encoding block to acquire first prediction values corresponding to the encoding blocks; utilizing the linear model prediction to process each encoding block to acquire second prediction values corresponding to the encoding blocks; utilizing the intra-frame prediction to process each encoding block to acquire third prediction values corresponding to the encoding blocks.

2. The compensation table compressing method as claimed in claim 1, wherein the step of utilizing the simple inter-frame prediction to process each encoding block to acquire first prediction values corresponding to the encoding blocks, comprises:

acquiring a reference frame compensation table; and matching a pixel reconstruction value corresponding to each encoding block in the reference frame compensation table with a compensation table to be compressed such that a first prediction value corresponding to each encoding block in the compensation table to be compressed is equal to the pixel reconstruction value corresponding to each encoding block in the reference frame compensation table.

3. The compensation table compressing method as claimed in claim 1, wherein the step of the utilizing the linear model prediction to process each encoding block to acquire second prediction values corresponding to the encoding blocks, comprises:
  acquiring a reference frame compensation table;
  matching a pixel reconstruction value corresponding to each encoding block in the reference frame compensation table with a compensation table to be compressed such that a fourth prediction value corresponding to each encoding block in the compensation table to be compressed is equal to the pixel reconstruction value corresponding to each encoding block in the reference frame compensation table; and
  linear-deviation correcting the fourth prediction value corresponding to each encoding block in the compensation table to be compressed to acquire a second prediction value corresponding to each encoding block in the compensation table to be compressed.

4. The compensation table compressing method as claimed in claim 3, wherein the step of linear-deviation correcting the fourth prediction value corresponding to each encoding block in the compensation table to be compressed to acquire a second prediction value corresponding to each encoding block in the compensation table to be compressed, comprises:
  acquiring a first pixel reconstruction value of an adjacent region of each encoding block in the compensation table to be compressed, and a second pixel reconstruction value of a corresponding region of the reference frame compensation table;
  according to the first pixel reconstruction value and second pixel reconstruction value, acquiring a weighted coefficient value and an offset value, wherein $$a = \frac{N*\sum(L(n)*C(n)) - \sum L(n)*\sum C(n)}{N*\sum(L(n)*L(n)) - \sum L(n)*\sum L(n)},$$

$$b = \frac{\sum C(n) - a*\sum L(n)}{N},$$

a indicates the weighted coefficient value, b indicates the offset value, N indicates a number of pixels in the adjacent region; L(n) indicates the first pixel reconstruction value; C(n) indicates the second pixel reconstruction value;
  processing the fourth prediction value, the weighted coefficient value and the offset value to acquire the second prediction value corresponding to each encoding block in the compensation table to be compressed, wherein $pred_F = a*pred+b$, $pered_F$ indicates the second prediction value, pred indicates the fourth prediction value.

5. The compensation table compressing method as claimed in claim 2, wherein the step of acquiring a reference frame compensation table, comprises:
  acquiring a value to be compressed of each of pixels in the compensation table to be compressed, and a pixel reconstruction value of each pixel in each of compressed compensation tables;
  according to the value to be compressed of each pixel in the compensation table to be compressed and the pixel reconstruction value of each pixel in the compressed compensation table, acquiring a sum of absolute errors of a corresponding compressed compensation table the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel; and
  in the compressed compensation tables, selecting one compressed compensation table with a minimum one of the sums of the absolute errors as a reference frame compensation table.

6. The compensation table compressing method as claimed in claim 3, wherein the step of acquiring a reference frame compensation table, comprises:
  acquiring a value to be compressed of each of pixels in the compensation table to be compressed, and a pixel reconstruction value of each pixel in each of compressed compensation tables;
  according to the value to be compressed in the compensation table to be compressed and the pixel reconstruction value of each pixel in the compressed compensation table, acquiring a sum of absolute errors of a corresponding compressed compensation table and the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel; and
  in the compressed compensation tables, selecting one compressed compensation table with a minimum one of the sums of the absolute errors as a reference frame compensation table.

7. The compensation table compressing method as claimed in claim 4, wherein the step of acquiring a reference frame compensation table, comprises:
  acquiring a value to be compressed of each of pixels in the compensation table to be compressed, and a pixel reconstruction value of each pixel in each of compressed compensation tables;
  according to the value to be compressed in the compensation table to be compressed and the pixel reconstruction value of each pixel in the compressed compensation table, acquiring a sum of absolute errors of a corresponding compressed compensation table and the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel; and
  in the compressed compensation tables, selecting one compressed compensation table with a minimum one of the sums of the absolute errors as a reference frame compensation table.

8. The compensation table compressing method as claimed in claim 1, wherein the step of utilizing the intra-frame prediction to process each encoding block to acquire third prediction values corresponding to the encoding blocks, comprises:
  acquiring pixel reconstruction values of pixels of an adjacent region corresponding to each encoding block; and acquiring an average value of the pixel reconstruction values of the pixels such that the third prediction value corresponding to each encoding block is equal to the average value of the pixel reconstruction values of the pixels of the adjacent region corresponding to each encoding block.

9. The compensation table compressing method as claimed in claim 1, wherein the step of compression-processing the prediction error corresponding to each encoding block, comprises: transforming, quantifying and entropy-encoding the prediction error.

10. A compensation table compressing method, comprising steps as follows:
acquiring multiple compensation tables of frames that are sequentially arranged;
dividing each compensation table of each frame into multiple encoding blocks, and processing each encoding block by multiple prediction modes to acquire prediction values corresponding to the prediction modes;
through a rate distortion optimizing method selecting one prediction mode with a minimum rate distortion optimizing value in each encoding block, and making subtraction between a prediction value corresponding to the prediction mode with the minimum rate distortion optimizing value in each encoding block and a value to be compressed of the encoding block to acquire a prediction error;
compression-processing the prediction error corresponding to each encoding block.

11. The compensation table compressing method as claimed in claim 10, wherein the prediction modes include: simple inter-frame prediction, linear model prediction and intra-frame prediction;
the step of dividing each compensation table of each frame into multiple encoding blocks, and processing each encoding block by multiple prediction modes to acquire prediction values corresponding to the prediction modes, comprises:
utilizing the simple inter-frame prediction to process each encoding block to acquire first prediction values corresponding to the encoding blocks; utilizing the linear model prediction to process each encoding block to acquire second prediction values corresponding to the encoding blocks; utilizing the intra-frame prediction to process each encoding block to acquire third prediction values corresponding to the encoding blocks.

12. The compensation table compressing method as claimed in claim 11, wherein the step of utilizing the simple inter-frame prediction to process each encoding block to acquire first prediction values corresponding to the encoding blocks, comprises:
acquiring a reference frame compensation table; and
matching a pixel reconstruction value corresponding to each encoding block in the reference frame compensation table with a compensation table to be compressed such that a first prediction value corresponding to each encoding block in the compensation table to be compressed is equal to the pixel reconstruction value corresponding to each encoding block in the reference frame compensation table.

13. The compensation table compressing method as claimed in claim 11, wherein the step of the utilizing the linear model prediction to process each encoding block to acquire second prediction values corresponding to the encoding blocks, comprises:
acquiring a reference frame compensation table;
matching a pixel reconstruction value corresponding to each encoding block in the reference frame compensation table with a compensation table to be compressed such that a fourth prediction value corresponding to each encoding block in the compensation table to be compressed is equal to the pixel reconstruction value corresponding to each encoding block in the reference frame compensation table; and
linear-deviation correcting the fourth prediction value corresponding to each encoding block in the compensation table to be compressed to acquire a second prediction value corresponding to each encoding block in the compensation table to be compressed.

14. The compensation table compressing method as claimed in claim 13, wherein the step of linear-deviation correcting the fourth prediction value corresponding to each encoding block in the compensation table to be compressed to acquire a second prediction value corresponding to each encoding block in the compensation table to be compressed, comprises:
acquiring a first pixel reconstruction value of an adjacent region of each encoding block in the compensation table to be compressed, and a second pixel reconstruction value of a corresponding region of the reference frame compensation table;
according to the first pixel reconstruction value and second pixel reconstruction value, acquiring a weighted coefficient value and an offset value, wherein $$a = \frac{N * \sum(L(n)*C(n)) - \sum L(n) * \sum C(n)}{N * \sum(L(n)*L(n)) - \sum L(n) * \sum L(n)},$$

$$b = \frac{\sum C(n) - a * \sum L(n)}{N},$$

a indicates the weighted coefficient value, b indicates the offset value, N indicates a number of pixels in the adjacent region; L(n) indicates the first pixel reconstruction value; C(n) indicates the second pixel reconstruction value;
processing the fourth prediction value, the weighted coefficient value and the offset value to acquire the second prediction value corresponding to each encoding block in the compensation table to be compressed, wherein $pred_F$=a*pred+b, $pered_F$ indicates the second prediction value, pred indicates the fourth prediction value.

15. The compensation table compressing method as claimed in claim 12, wherein the step of acquiring a reference frame compensation table, comprises:
acquiring a value to be compressed of each of pixels in the compensation table to be compressed, and a pixel reconstruction value of each pixel in each of compressed compensation tables;
according to the value to be compressed in the compensation table to be compressed and the pixel reconstruction value of each pixel in the compressed compensation table, acquiring a sum of absolute errors of a corresponding compressed compensation table and the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel; and in the compressed compensation tables, selecting one compressed compensation table with a minimum one of the sums of the absolute errors as a reference frame compensation table.

16. The compensation table compressing method as claimed in claim 13, wherein the step of acquiring a reference frame compensation table, comprises:

acquiring a value to be compressed of each of pixels in the compensation table to be compressed, and a pixel reconstruction value of each pixel in each of compressed compensation tables;

according to the value to be compressed in the compensation table to be compressed and the pixel reconstruction value of each pixel in the compressed compensation table, acquiring a sum of absolute errors of a corresponding compressed compensation table and the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel; and in the compressed compensation tables, selecting one compressed compensation table with a minimum one of the sums of the absolute errors as a reference frame compensation table.

17. The compensation table compressing method as claimed in claim 14, wherein the step of acquiring a reference frame compensation table, comprises:

acquiring a value to be compressed of each of pixels in the compensation table to be compressed, and a pixel reconstruction value of each pixel in each of compressed compensation tables;

according to the value to be compressed in the compensation table to be compressed and the pixel reconstruction value of each pixel in the compressed compensation table, acquiring a sum of absolute errors of a corresponding compressed compensation table and the compensation table to be compressed, wherein SAD=Σ|f1(x,y)−f2(x,y)|, SAD indicates the sum of the absolute errors, x, y indicate a pixel coordinate, f1 indicates the value to be compressed corresponding to a pixel to be compressed, f2 indicates the pixel reconstruction value corresponding to a compressed pixel; and in the compressed compensation tables, selecting one compressed compensation table with a minimum one of the sums of the absolute errors as a reference frame compensation table.

18. The compensation table compressing method as claimed in claim 11, wherein the step of utilizing the intra-frame prediction to process each encoding block to acquire third prediction values corresponding to the encoding blocks, comprises:

acquiring pixel reconstruction values of pixels of an adjacent region corresponding to each encoding block; and acquiring an average value of the pixel reconstruction values of the pixels such that the third prediction value corresponding to each encoding block is equal to the average value of the pixel reconstruction values of the pixels of the adjacent region corresponding to each encoding block.

19. The compensation table compressing method as claimed in claim 10, wherein the rate distortion optimizing value is J=D+λ×R, wherein D refers to a deviation between the prediction value of a corresponding encoding block and the value to be compressed, λ refers to a weight factor, R indicates a number of bits needed for storing all information under a current prediction mode.

20. The compensation table compressing method as claimed in claim 10, wherein the step of compression-processing the prediction error corresponding to each encoding block, comprises: transforming, quantifying and entropy-encoding the prediction error.

* * * * *